United States Patent [19]

Schönthal et al.

[11] Patent No.: US 6,169,927 B1
[45] Date of Patent: *Jan. 2, 2001

(54) CONTROL SYSTEM FOR AN INDUSTRIAL INSTALLATION

(75) Inventors: Hagen Schönthal, Stutensee; Peter Fritz, Karlsruhe; Karl-Otto Kessler, Maikammer; Horst Walz, Straubenhardt, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/737,053

(22) PCT Filed: Apr. 27, 1995

(86) PCT No.: PCT/DE95/00569

§ 371 Date: Nov. 5, 1996

§ 102(e) Date: Nov. 5, 1996

(87) PCT Pub. No.: WO95/30937

PCT Pub. Date: Nov. 16, 1995

(30) Foreign Application Priority Data

May 10, 1994 (DE) .................................................. 44 16 547

(51) Int. Cl.$^7$ ...................................................... G06F 17/00
(52) U.S. Cl. .................................................................. 700/1
(58) Field of Search ................................... 364/138, 468, 364/140, 146, 148, 468.1, 474.11; 395/710; 700/1

(56) References Cited

U.S. PATENT DOCUMENTS

| 4,819,149 |   | 4/1989 | Sanik et al. ........................... 364/132 |
| 5,006,992 | * | 4/1991 | Skeirik ............................... 364/148 X |
| 5,050,088 | * | 9/1991 | Buckler ................................ 364/468 |
| 5,386,568 | * | 1/1995 | Wold et al. ........................... 395/710 |

FOREIGN PATENT DOCUMENTS

| 32 14328 C2 | 9/1987 | (DE) . |
| 0 162 670 | 11/1985 | (EP) . |
| 0 397 924 | 11/1990 | (EP) . |
| 0 413 044 A1 | 2/1991 | (EP) . |
| 0 434 986 A3 | 7/1991 | (EP) . |
| 0 524 344 A1 | 1/1993 | (EP) . |
| 0 531 653 A2 | 3/1993 | (EP) . |

OTHER PUBLICATIONS

Muhlhauser et al, "DOCASE: A Methodic Approach to Distributed Programming" Communications of the ACM v 36 n 9 p 127 (12), Sep. 1993.*

Nicholson, E., "Standardizing I/O for Mechatronic Systems (SIOMS) using Real Time UNIX Device Drivers," Proceedings 1994 IEEE International Conference on Robotics and Automation, May 8–13, 1994, San Diego California.

Klose, F., "Einheitliches Kommunikationssystem für die Prozessautomatisierung," etz Bd. 104 (1983) Heft, pp. 1024–1027.

* cited by examiner

Primary Examiner—M. Kemper
(74) Attorney, Agent, or Firm—Kenyon & Kenyon

(57) ABSTRACT

A control system for an industrial plant, where the control system includes an automation level, a management level and a control level hierarchically located below the management level and above the automation level. The control system also includes functional units situated in the control level and executing respective functions. The functional units receive input values and process these input values using the respective functions. The functional units are interlinkable as a function of technical problems to be solved. These functional units have a modular designed, each of the functional units including a configurable input area, a configurable functional area and a configurable output area. In addition, each of the functional units is connected to the management level, to the automation level and to another functional unit via data transfer media. The respective function of each of the functional units in the configurable functional area is provided as a function of the technical problems to be solved, and the configurable output area of each of the functional units is connected to the configurable input area of a further one of the functional units as a function of the technical problems to be solved.

12 Claims, 4 Drawing Sheets

CONTROL SYSTEM FOR AN INDUSTRIAL INSTALLATION

TECHNICAL FIELD OF THE INVENTION

The present invention relates to a control system for an industrial application with a control level hierarchically situated below a management level and above an automation level. Such industrial installations may include, for example, fossil fuel or nuclear power plants, and manufacturing or process plants.

BACKGROUND OF THE INVENTION

In a power plant, monitoring equipment must display the current operating status of the system and report any deviations from a reference status. A comprehensive system for measuring actual values of the operating states of all system components, a comprehensive system for evaluating the measured values that is commensurate with the complexity of the system, and a system component status display prepared in the visual form with a high degree of information compression are required for this purpose.

A control system must meet the aforementioned requirements. Due to the high complexity of such industrial installations, such a control system must be of a simple linear design. This means, on one hand, that system components should be capable of being monitored and adjusted by the control system and, on the other hand, it should be possible to integrate new and/or revised and modified control, adjustment, and/or evaluation options into the existing control system.

OBJECTS AND SUMMARY OF THE INVENTION

The aforementioned characteristics are not achieved with the prior art control systems. Therefore, the object of the invention is to provide a control system, in particular, a computer-aided control system, wherein the level for estimating and evaluating the measured values is highly configurable.

This problem is solved according to the invention by the modular construction of the control level, which includes a plurality of functional units for processing input values according to their respective functions, wherein said units are interconnectable according to a plurality of industrial tasks to be performed.

Due to this modular design of the control level and its systems, the control system at this level can be structured and graphically configured in almost any desired manner. Functional units can be modified, expanded, removed, or reconnected at any time in order to perform an industrial task, such as, for example, management of certain system components, information processing, parameter calculation or balancing. The input values processed can be measured values directly acquired by the automation level, measured values calculated with an appropriate function, intermediate results of other functional units, and configurable parameters that can be provided via the management level.

In such a mostly computer-aided control system, it is desirable that the control level and the levels connected to the control level be managed within a common system environment. For this purpose, it is convenient if an operating system, preferably a commercially available operating system such as, for example, UNIX or OS-2, supporting the management level, control level and automation level, as well as data transfer among these levels, is provided. Such operating systems also support free connectivity of the functional units arranged on the control level. In addition, a high degree of independence of the control system in relation to the rate of innovation of the computer hardware is achieved in this way.

In an especially advantageous refinement of the invention, the functional units can have a modular design. In this way, an arbitrarily definable task can be assigned to each functional unit, and the functional unit can be created using pre-storable elements.

An especially advantageous embodiment of a modular functional unit is obtained if it comprises an arbitrarily configurable input area, a functional area, and an output area. In this way, each area of the functional unit can be configured independently. Furthermore, each area can be adapted to changed conditions even during the operation of the industrial system. The inputs of functional units can be connected to the outputs of other functional units by standardizing the interfaces of the functional units.

In order to design particularly simple configurable input areas, it is desirable to define a data type, a connection type, and a mode of supply for the input area. Similarly, a data type, a connection type, and a mode of disposal can be defined for the output area.

Under the keyword "data type," the type of data reaching and leaving the functional unit is defined. These can have, for example, the character of real values (real numbers), integer values (integers), Boolean values (true/false statements), or strings, which can also be transmitted in any desired, but definable, sequence as a data block or data set.

Under the keyword "connection type," the connection of the functional unit to other functional units is defined. The connection can, in particular, consist of a ring connection or a queue connection or a service order connection or a data container connection. The buffer mechanism is indirectly defined by the connection type. For example, in the case of a ring connection, a configurable number of values from different function runs are stored in a cyclic buffer.

The keywords "mode of supply" and "mode of disposal" are defined so that an input is explicitly supplied or an output is explicitly disposed of if the functional unit explicitly (also with any desired frequency) initiates the data reception or data output when performing its function. An implicit supply or disposal mode is present if it has been determined that the functional unit has data available basically prior to executing its function or outputs data basically after it has executed its function without additional measures being required for this purpose.

On the basis of the aforementioned options for defining the input and/or output area, it is ensured that the input and/or output area can be adapted to the technological problem to be solved in any desired manner, but using pre-defined means. The ensures uniform, and thus reliable, data exchange for all functional units and uniform and reliable data management for all functional units.

In an advantageous embodiment of the invention, the functional area may contain a functional unit program, for example, a program written in any desired programming language, which includes at least one function set consisting of at least one logic and/or at least arithmetic function, depending on the technological problem to be solved. In this manner, technical experts can program their special technological know-how without needing tie their algorithm (function set) itself into the control system. This will be taken by them from the standardized environment, in particular, through the configurable input and output areas of the functional units. Furthermore, logical operations, ready-made by technological experts, such as for example AND, OR, XOR, and NOR relationships and arithmetic functions such as, for example, differentiation, averaging, and integration, can be available to the technological experts, so that a function set is obtained in part through structuring and in part through programming.

BRIEF DESCRIPTION OF THE DRAWINGS

Embodiments of the invention are explained in detail with respect to the drawings, of which.

DETAILED DESCRIPTION

Figure 1A:
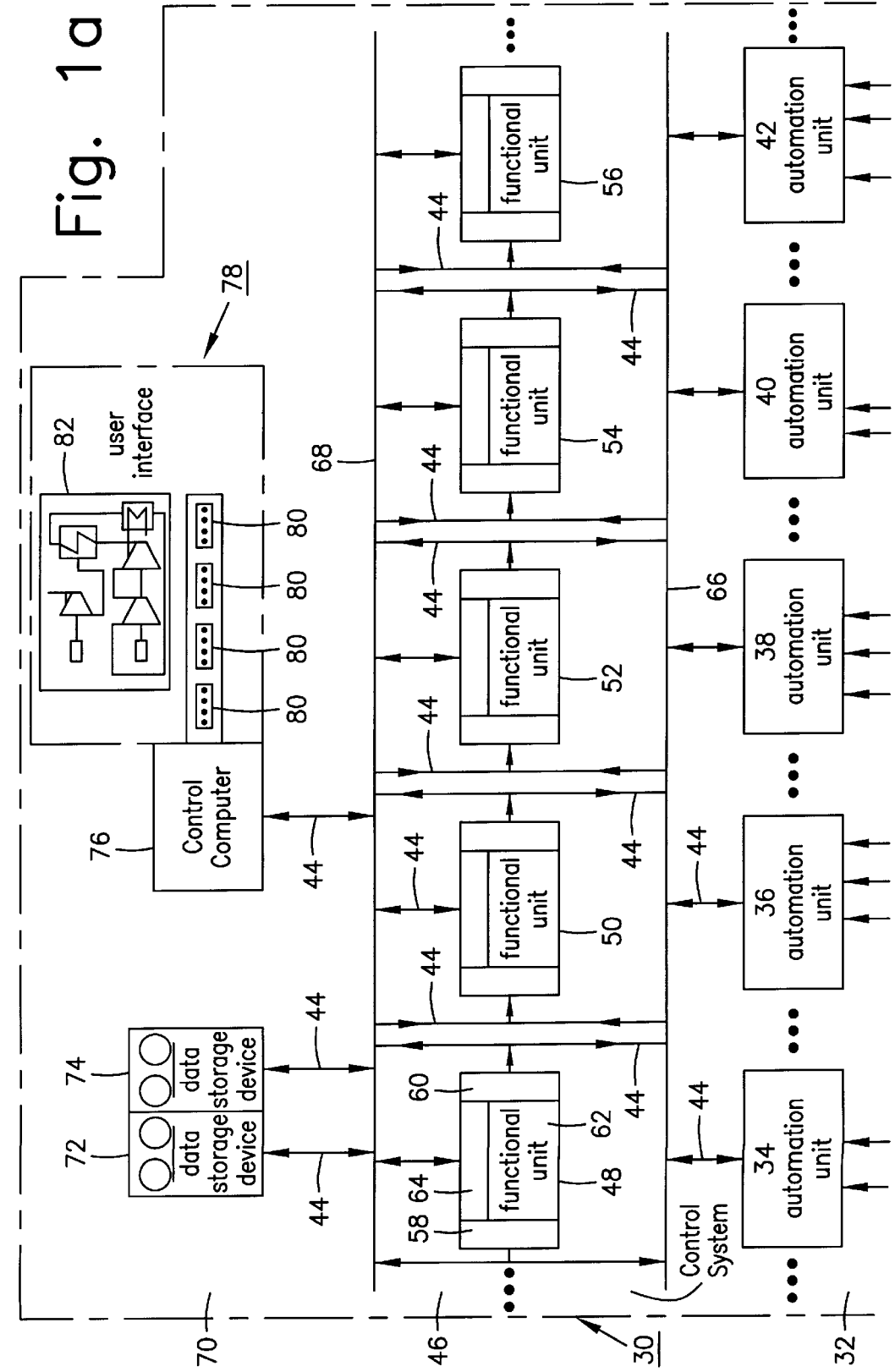
FIG. 1 is a schematic diagram of a control system and of a combined power plant system managed by this control system.
Figure 1B:
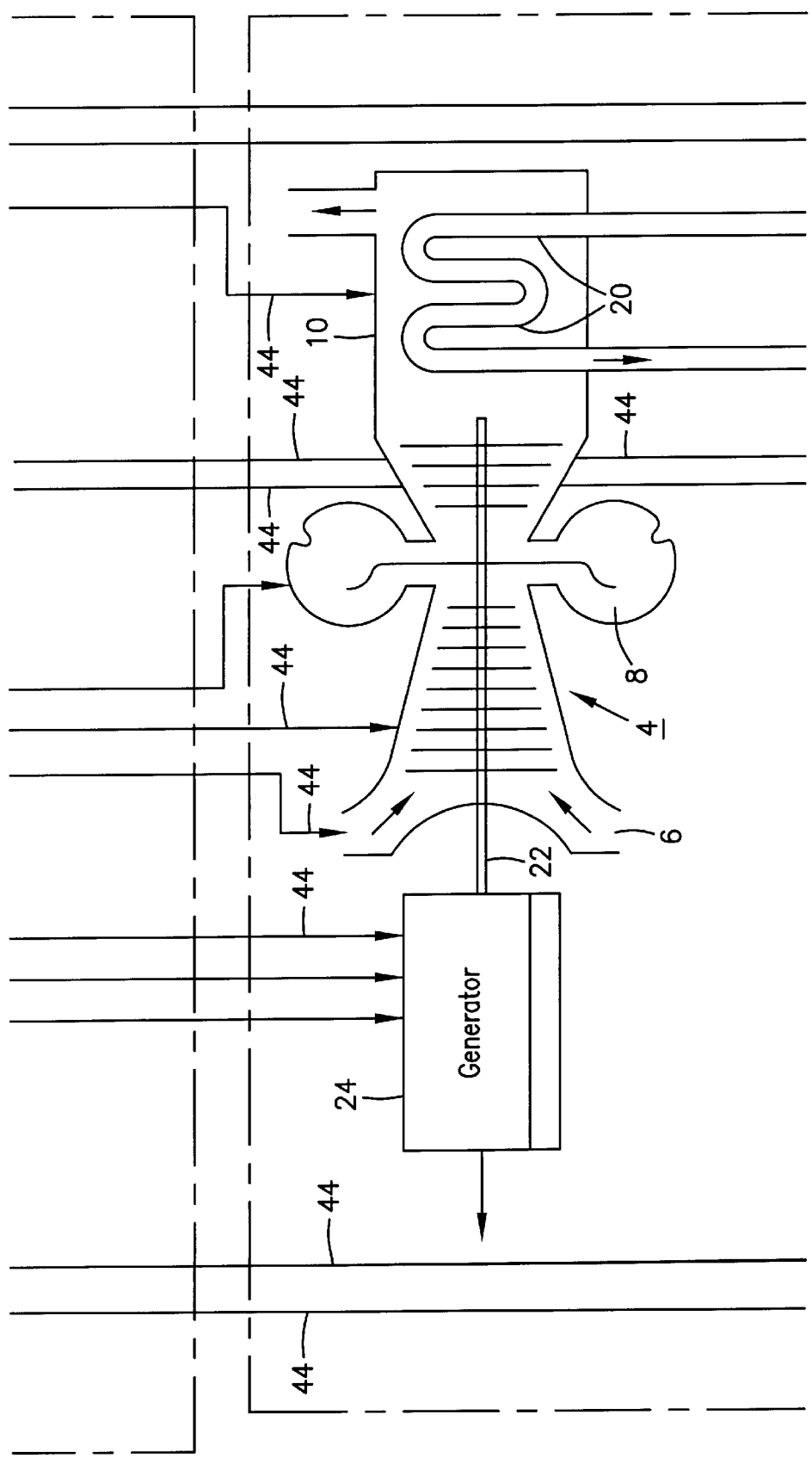

A gas-steam turbine system 2 (combined power plant) comprises a gas turbine 4 with air intakes 6 and combustion chambers 8, and a steam generator 10 attached to gas turbine 4. A water-steam circuit 12 associated to a steam turbine 14 includes, in sequence, a high-pressure section 14a of gas turbine 14, a medium-pressure 14b of steam turbine 14, a condenser 16, a water pump 18 and heat exchanger tubes 20 in steam generator 10. A generator 24 is driven through a shaft 22 driven by gas turbine 4. Another generator 28 is driven through a shaft 26 driven by steam turbine 14.

A control system 30 is shown schematically, graphically superimposed on the combined power plant. This control system 30 includes automation units 34 through 42 on an automation level 32. These automation units 34 through 42 are directly connected to the system units of combined power plant 2 through bidirectional data lines 44. Thus, for example, automation unit 34 is connected to generator 28 and monitors the temperature of generator 28, measures its electric output, and adjusts the hydrogen cooling circuit of generator 28. Furthermore, this automation unit 34 can, for example, automatically test the cooling circuit for hydrogen leaks.

Automation unit 36 is assigned to generator 24 and has approximately the same functions performed by automation unit 34 in relation to generator 28.

Automation unit 38 is assigned to gas turbine 4 and monitors and/or adjusts a plurality of process parameters. These include, for example, the amount and temperature of air at air inlets 6, the turbine rotation speed, the temperature in combustion chamber 8, the fuel delivery, etc.

Automation unit 40 is assigned to steam turbine 14, monitors steam turbine 14, and adjusts the parameters relevant to the operation of steam turbine 14 such as, for example, gas turbine 4 temperature, rotation speed, etc.

Automation unit 42 is assigned to water-steam circuit 12, monitors it and adjusts the cooling capacity of condenser 16, the capacity of water pump 18, the steam pressure, etc.

Hierarchically above automation level 32 is a control level 46, configured modularly and including functional units 48 through 56. Functional units 48 through 56 have a modular design themselves and each one comprises an input area 58, an output area 60, a functional area 62, and a service interface 64. On the input and output sides, functional units 48 through 56 are connected, via bidirectional data lines 44, to both a data transfer medium 66, which is also connected to automation units 34 through 42 via bidirectional data lines 44, and to another data transfer medium 68, which establishes connection to a management level 70.

On this management level 70, hierarchically above control level 46, there are provided data storage devices 72, 74, and a control computer 76, with a user interface 78 attached to it. User interface 78 includes a plurality of terminals 80 and a large-image screen 82. This allows the system operator to intervene in the largely automated operation of gas-steam power plant 2. Large-image screen 82 provides a static and dynamic display of the system process for this purpose.

During the operation of gas-steam power plant 2, the individual system components, e.g., generators 24, 28, turbines 4, 14, and water-steam circuit 12, are monitored and adjusted by automation units 34 through 42 mostly automatically. The data that are especially relevant to the operation of gas-steam power plant 2, including the data for large-image screen 82, on which a diagram of the process and its current operating status are displayed, are output via bidirectional data lines 44 to data transfer medium 66 and then further processed. Each of automation units 34 through 42 includes a clearly defined function and performs a well-defined task. No function outside the functions of automation units 34 through 42 for the solution of a technological problem that does not pertain to the corresponding system component to be monitored and/or adjusted can be performed on the automation level.

Only the hierarchically higher control level 46 is authorized to execute technological tasks such as, for example, process management and process parameter or balance calculations. Due to the modular design of this control level, these problems are particularly easy to solve. Using the underlying technological know-how regarding gas-steam power plant 2 and the interaction of its components, functional units 48 through 56 are enabled to solve specific technical problems. The actual technological know-how basically consists of an algorithm (function set) set up by an expert. Depending on the technical problem to be solved, functional units 48 through 56 can be connected in any desired manner; using such a control level 46, technical problems of any complexity can be solved not through time-consuming programming, but through appropriate and clear structuring. Thus, for example, boiler component service life calculations can be performed using boiler efficiency, obtained from a certain functional unit, and from the fuel parameters, which can be provided, for example, via user interface 78. By linking the operating parameters of gas turbine 4 and the materials used in gas turbine 4, as well as the chemical composition of the fuel, the service life of turbine components can also be estimated. Linkage of functional units 48 through 56 is also required for balance calculations.

Since functional units 48 through 56 are configurable in any desired manner regarding their input areas 58, their output areas 60, and their functional areas 62, the system operator has considerable latitude in adapting control system 30 to conditions that may be very complex, as is the case, for example, of combined power plant 2.

The results obtained by functional units 48 through 56 that are relevant to the operation of industrial system 2 are output to data transfer medium 68, stored in data storage device 72, and further processed by control computer 76 for graphic display of the instantaneous process status.

Control computer 76 provides an operating system, which supports management level 70, control level 46, and automation level 23, as well as data transfer among these levels.

In the present example of embodiment, this operating system is UNIX. Functional units 48 through 56 are also included in this operating system, so that a type of processing can be assigned to each functional unit 48 through 56, and the processing of functional units 48 through 56 can be controlled. This is described below in more detail and illustrated in FIGS. 2 and 3. The properties of functional units 48 through 56 and their interaction in a processing sequence are also described below and also illustrated in FIGS. 2 and 3.

Figures 1, 1C:
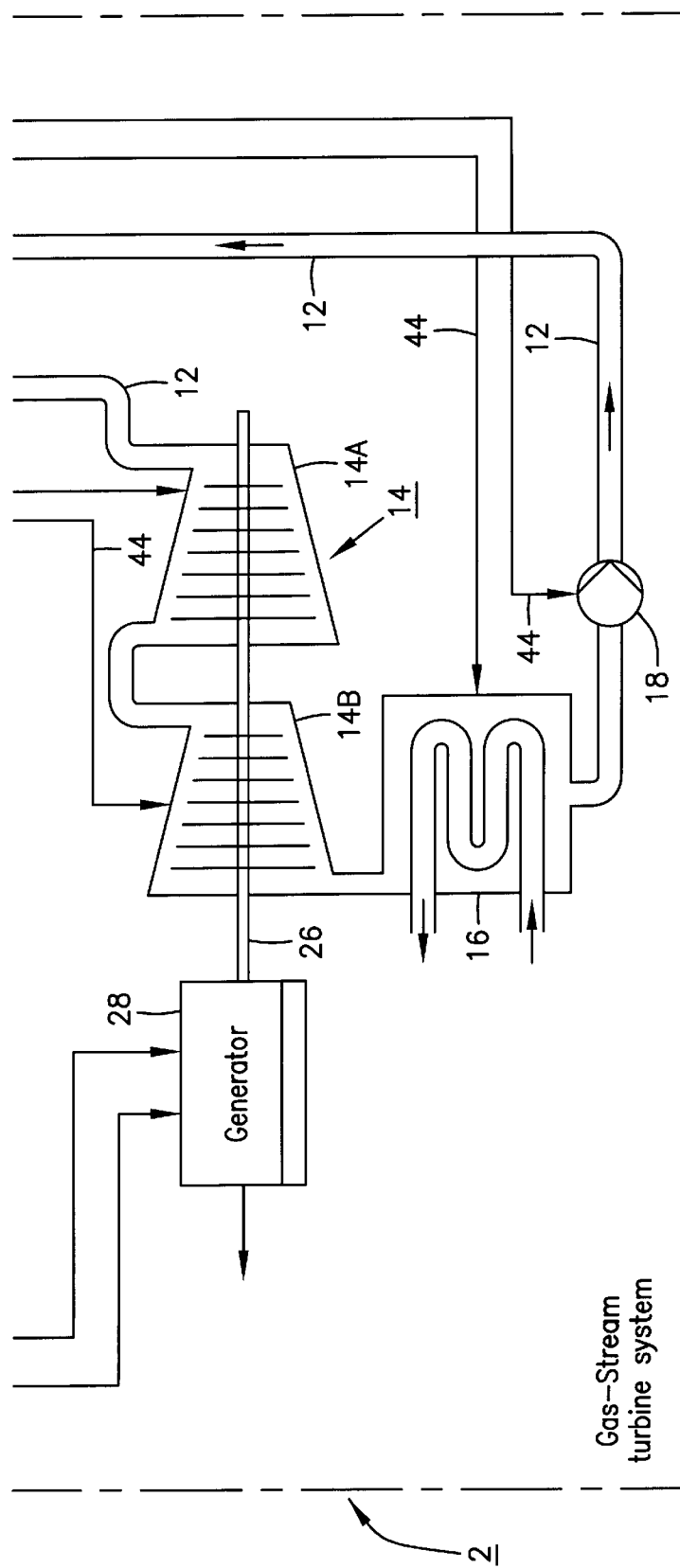
Figure 2:
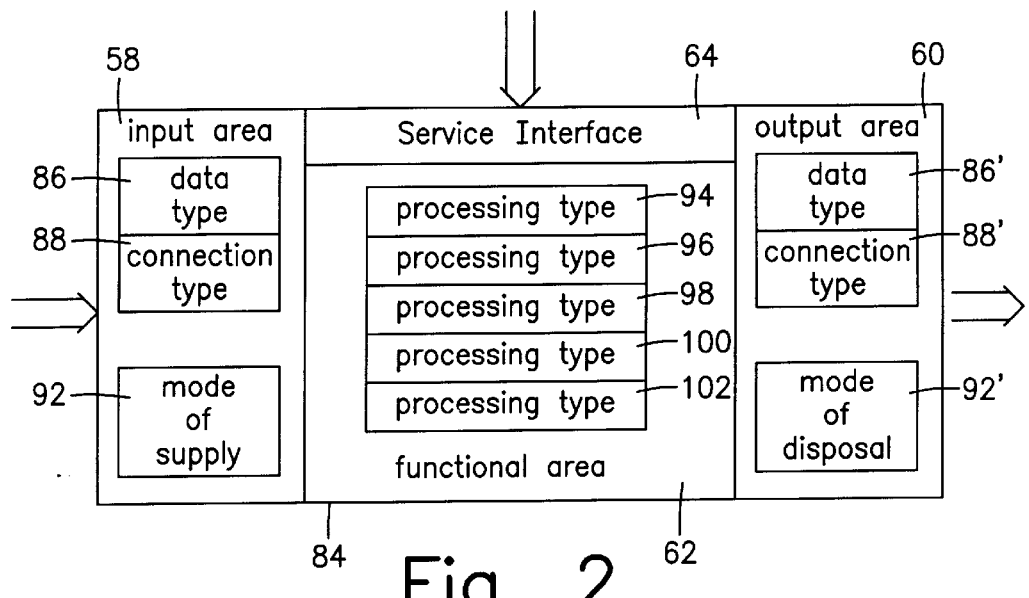
FIG. 2 is a schematic diagram of a functional unit.

FIG. 2 schematically represents the design of a functional unit 84. This design is identical to that of functional units 48 through 56 of FIG. 1. Functional unit 84, like functional units 48 through 56, has an input area 58, an output area 60, a functional area 62, and a service interface 64. Due to the modular design of functional unit 84, areas 58, 60, and 62 are freely configurable, which makes it possible to define the actual function of the functional unit and the linkage of this unit with other functional units according to the technical problem to be solved.

The individual features that can be designed into areas 58, 60, and 62 are represented by rectangular boxes.

A data type 86, a connection type 88, and a mode of supply 92 are defined for input area, henceforward also referred to as input 58. A similar situation applies to output area 60, where also a data type 86', a connection type 88', and a mode of disposal 92' are defined. Data type 86 describes the structure of the data expected by functional unit 84 at this input. In principle, any imaginable data type is allowed. However, the broad capabilities of the functional units may require that the data be limited to as few as possible standard types, such as "real values," "integer values," "Boolean values," or "string variables."

Connection type 88 determines with what connections input 58 can be linked. In the examplary embodiment, distinction is made among the following connection types: ring, queue, service order, and data container. A service function of service interface 64 can be called, e.g., under the name "import," for reading data over a ring connection. The time of the call can be determined freely; unlike the inputs of all other connection types, the ring input can be assigned parameters, i.e., a value read in during the first read process can be provided. A ring connection supports two functions as mode of supply 92. On one hand, the input can be supplied explicitly, i.e., functional unit 84 explicitly calls the desired data with a service function at a predefinable time. On the other hand, as an alternative, implicit mode of supply means that functional unit 84 has the predefinable data set at its disposal, at its input 58, immediately prior to the execution of the function.

In the case of the queue connection, functional unit 84 uses the service function "import" again for reading; in contrast to the ring connection, it may, however happen that no data set is present and therefore no data set is read. The service function call is then acknowledged negatively. The queue connection only supports the explicit mode of supply.

A service order connection is present when functional unit 84 can process service orders placed by other functional units A service order connection is always bidirectional and has a client-server character. The service order connection only supports the explicit type of supply.

A data container connection is present when, contrary to the other types of connection, the data sets are not read in through the internal data buffer provided. Instead, functional unit 84 finds address information there with which functional unit 84 can access the contents of the internal or external data containers, for example data storage devices 72, 74, connected to functional unit 84.

In this way, universal connectivity with output areas 60 of other functional units and a high degree of data security in the data transfer is ensured for input area 58.

Regarding output area 60, the procedure is similar as in the case of input area 58. A data type 86' can be defined in a similar manner as was data type 86. A connection type 88' has the data transfer or service order options. In contrast with input area 58, a data set is not read with the service function "input," but a data set is output, for which purpose another service function is used, which can be called, for example, under the name "export." Furthermore, it should be noted that a ring connection can have any desired number of readers, but can only have only one or no writer. In the latter case, it is characterized by parameters.

In the case of a connection type defined as a ring connection 88', either only one data set (the current one) is being managed or the current and the next oldest or the current and a definable number of older data sets can be used.

Just as input area 58 can be supplied explicitly or implicitly, a mode of disposal 92' can be defined for output area 60. An output can be disposed of explicitly or implicitly; this means that in the case of explicit disposal a data set is output by unit 84 at a definable point in time; in the case of an implicit disposal, however, a data set is output immediately after the execution of the function by functional unit 84.

Functional area 62 of unit 84 includes a functional unit program where the actual function of function unit 84 is defined. Possible functions include arithmetic functions such as, for example, integration, differentiation, averaging, statistical functions, and prognosis functions, but also logical functions such as, for example, AND, OR, NOR, and XOR linkages. Depending on the technical problem to be solved, these functions and linkages are combined into a function set, which consequently contains at least one arithmetic operation and/or at least one logical operation.

According to a processing type 94 through 102, a functional unit program can include a plurality of function sets, which are subprograms of the functional unit program. Each processing type 94 through 102 represents a status of functional unit 84 in the performance of its function.

Thus, for example, the function set of processing type 94 is assigned to the first run of functional unit 84. Similarly, the function set of processing type 96 is assigned to normal run. The function set of processing type 98 represents the final run of the unit. The function set of processing type 100 represents the restart run of functional unit 84, and the function set of processing type 102 represents a configuration run.

The processing type required during the current process can be triggered by the operating system, for example, by an operator in control wait 78 through service interface 64. For example, when combined power plant 2 is started up, the first run processing type can be defined for all the functional units. Functional units performing a periodically repeated function, e.g. hourly, daily, or monthly statistics, perform a functional unit processing according to the given time interval. This sequence control can, as mentioned before, be defined in any desired manner, and is output through the operating system to functional units 48 through 56, 84. Cyclic, sporadic events, but also a combination of cyclic and sporadic events can be defined as initial conditions; an absolute point in time, e.g., month- or year-end, can also be defined.

Sequence control is executed by service interface 64, activated by a call made by the operating system, which establishes the contact of functional unit 84 with the operating system. Furthermore, the service functions, such as "import" and "export," needed by functional unit 85 to read data sets from the given connection type 88 or to write data sets into the given connection type 88', can also be made available in service interface 64.

Figure 3:
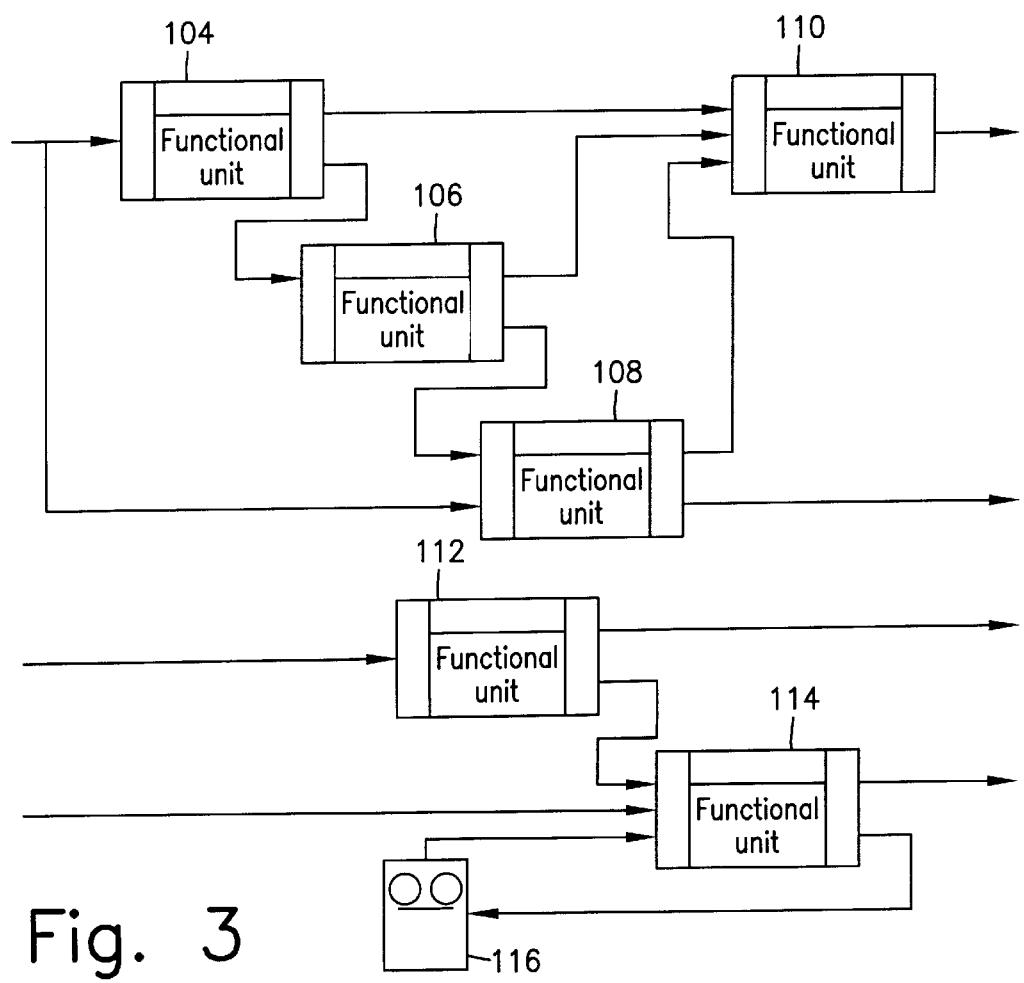
FIG. 3 is a schematic diagram illustrating a sequence in which a plurality of functional units according to FIG. 2 perform their functions.

FIG. 3 schematically shows how a number of functional units 104 through 110, which do not execute their functions independently of one another, are combined for a processing sequence.

Thus, for example, functional unit 104 reads data sets corresponding to the chemical composition of the waste gas of gas turbine 4, measured at given points in time. The function of functional unit 104 consists of determining daily concentration averages of harmful substances contained in the gas turbine waste gas. A functional unit 106 downstream reads the daily average for nitrogen oxide concentration from a ring connection and calculates the amount of ammonia required for the catalytic conversion of nitrogen oxide in a de-$NO_x$ plant not represented. Furthermore, functional unit 106 can perform a comparison between the calculated and actually consumed amounts of ammonia.

According to this calculation, functional unit 106 outputs the result, the calculated daily amount of ammonia, into a ring connection. This output activates the function of a functional unit 108, which also reads the input data available to functional unit 104 and the daily amount of ammonia from a ring connection. An aging value for the catalysts used in the de-$NO_x$ plant is determined from the daily amount of ammonia used, the average daily nitrogen oxide concentration, and from the temperature distribution of the gas turbine waste gas during a day. This result is output into a ring connection and functional unit 110 can perform its function. It reads from the ring connection the results of functional units 104 through 108 using them to balance the daily costs incurred by the operator of combined power plant 2 for smoke gas purification. Due to the modular design of control level 46, other features to be assigned to the waste gas purification complex can be easily included in the existing control system 30.

Alternatively, this processing sequence can also be reversed. Thus, for example, functional unit 110, which performs the balancing, can be started and then it can start units 104 through 108 within the service order connections, wait for their results and, after receiving those results, perform the balancing calculations and output the results, e.g., directly to user interface 78 on management level 70. These results can also be stored, for example, in storage device 74, which can be configured as a permanent storage device.

Functional units 112 and 114, which are independent of the processing sequence displayed graphically, can also perform their functions independently of this processing sequence, simultaneously, but also at any other desired predefinable point in time. Thus, functional unit 112 can, for example, read the running noise sampled with any predefinable frequency, for example, every minute, of gas turbine 4, convert this periodically sampled running noise of gas turbine 4 into a frequency spectrum of the running noise using an FFT (Fast Fourier Transformation), and output this spectrum as a data set into a ring connection. Functional unit 114 reads in this spectrum, loads, for example, one of the previous running noise spectra through a ring connection and loads, for example, the running noise spectrum or the new, unused gas turbine 4 from an external data storage device through a service order or data container connection.

As a result, functional unit 114, having for example an authority provided with alarm capability, outputs an estimated result obtained from a comparison of the current running noise spectrum and the spectrum of the new, unused gas turbine. If this comparison shows significant changes, i.e., significant harmonics have appeared in the spectrum, detailed conclusions can be drawn regarding the remaining operating time of gas turbine 4 until the next scheduled maintenance. Noise spectra especially strongly affected by interference, which may cause a scheduled maintenance to be brought forward in order to avoid the risk of turbine blade damage, can be output to data storage device 116 through a service order or data container connection and there read at a later time for purposes of analysis and simulation.

Due to the previously described modular design of control level 46 with freely connectable functional units 48 through 56, 84, 104 through 114, which here also have a modular design, it is possible to break down all monitoring and control procedures, as well as comprehensive information requirements on the operating status of combined power plant 2, and distribute their solutions to small, easy-to-control elements, such as functional units. Due to the predefinable system architecture and predefinable operating system, the technological information regarding the industrial system, here combined power plant 2, can be divided in any desired manner into easy-to-control, individually structurable functional units, thus solving a technical problem, such as for example balancing, by suitably linking (structuring) the functional units.

What is claimed is:

1. A control system for an industrial plant, the control system including an automation level, a management level and a control level hierarchically located below the management level and above the automation level, the control system comprising:

functional units situated in the control level and executing respective functions, the functional units receiving input data and processing the input data using the respective functions, the functional units being inter-linkable as a function of technical problems to be solved, wherein the functional units are modularly designed, each of the functional units including:

a configurable input area having a first data type, a first connection type and a supply mode indicator, the first data type indicating a type of data expected by each of the functional units, the first connection type indicating a type of connection of each of the functional units to another one of the functional units, the supply mode indicator distinguishing between reading data prior to an execution of the respective function of each of the functional units and initiating the reading data under the execution of the respective function, a configurable functional area, and a configurable output area having a second data type, a second connection type and a disposal mode indicator, the second data type indicating a type of data leaving the functional unit, the second connection type indicating a further type of connection of each of the functional units to another one of the functional units, the disposal mode indicator distinguishing between outputting data after the execution of the respective function of each of the functional units and initiating the outputting data under the execution of the respective function, wherein each of the functional units is connected to the management level and to the automation level via data transfer media, wherein the respective function of each of the functional units in the configurable functional area is provided as a function of the technical problems to be solved, and wherein the configurable output area of at least one of the functional units is connectable to the configurable input area of at least one further unit of the functional units via the data transfer media, the at least one further unit of the functional units being selected to be connected to the at least one functional unit as a function of the technical problems to be solved.

2. The control system of claim 1, wherein the management level, the control level, the automation level and data transfer among the levels is supported by an operating system.

3. The control system of claim 1, wherein each of the functional areas includes a functional unit program having at least one function set provided as a function of a respective one of the technical problems, the at least functional set including at least one of a logical function and an arithmetic function.

4. The control system of claim 3, wherein the at least one function set includes subprograms of the functional unit program, each of the subprograms being assigned a predetermined processing type.

5. The control system of claim 4, wherein the predetermined processing type is defined with an operating system independently from a respective one of the functional units.

6. The control system of claim 2, wherein respective one of the functional units includes a service interface having service functions, the service interface connecting the respective one of the functional units to the operating system.

7. The control system of claim 1, wherein the functional units are combinable to execute a processing sequence using a sequence of functions depending on the technical problem to be solved.

8. The control system of claim 7, wherein the respective functions independently executable by the functional units which do not belonging to the processing sequence.

9. The control system of claim 8, wherein the processing sequence of the functional units is controllable using an operating system.

10. The control system of claim 1, wherein the management level includes a user interface displaying data corresponding to an operation of the industrial plant, and wherein the user interface is utilized for adjusting an operating status of the industrial plant.

11. The control system of claim 1, wherein the automation level includes automation units assignable to specific system components.

12. The control system of claim 1, wherein the configurable output area of a first unit of the functional unit directs a second unit of the functional units to be executed by connecting to the configurable output area of the first unit to the configurable input area of the second unit.

\* \* \* \* \*